United States Patent
Lang et al.

(10) Patent No.: US 9,810,160 B2
(45) Date of Patent: Nov. 7, 2017

(54) GAS TURBINE TEMPERATURE MEASUREMENT

(71) Applicant: ALSTOM Technology Ltd, Baden (CH)

(72) Inventors: Wolfgang Lang, Lauchringen (DE); Jürgen Hoffmann, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 882 days.

(21) Appl. No.: 14/088,494

(22) Filed: Nov. 25, 2013

(65) Prior Publication Data
US 2014/0144156 A1 May 29, 2014

(30) Foreign Application Priority Data
Nov. 29, 2012 (EP) .................................. 12194772

(51) Int. Cl.
| | |
|---|---|
| G01K 11/22 | (2006.01) |
| G01N 25/20 | (2006.01) |
| G01K 13/00 | (2006.01) |
| G01K 3/00 | (2006.01) |
| F02C 9/28 | (2006.01) |

(Continued)

(52) U.S. Cl.
CPC ............... *F02C 9/28* (2013.01); *F02C 6/003* (2013.01); *G01K 11/24* (2013.01); *G01K 13/02* (2013.01); *G01M 15/14* (2013.01); *F05D 2270/303* (2013.01); *F05D 2270/80* (2013.01); *G01K 2013/024* (2013.01); *Y02E 20/14* (2013.01)

(58) Field of Classification Search
None
See application file for complete search history.

(56) References Cited

U.S. PATENT DOCUMENTS

| | | | | |
|---|---|---|---|---|
| 3,501,956 A | * | 3/1970 | Shibata .................. | G01K 11/22 374/119 |
| 4,280,183 A | * | 7/1981 | Santi ..................... | G01N 29/024 702/24 |

(Continued)

FOREIGN PATENT DOCUMENTS

| | | |
|---|---|---|
| EP | 0 620 363 | 10/1994 |
| EP | 0 718 470 | 6/1996 |

(Continued)

*Primary Examiner* — Mirellys Jagan
(74) *Attorney, Agent, or Firm* — Buchanan Ingersoll & Rooney PC (57) ABSTRACT

The disclosure relates to a method for determining a temperature in a pressurized flow path of a gas turbine comprising the steps of sending an acoustic signal from an acoustic signal emitting transducer across a section of the pressurized flow path, detecting the acoustic signal with a receiving transducer, measuring the time needed by the acoustic signal to travel from the acoustic signal emitting transducer to the receiving transducer, calculating the speed of sound, and calculating the temperature as a function of the speed of sound, the heat capacity ratio (□) and a specific gas constant ($R_{spec}$) of the gas flowing in the pressurized flow path.
Besides the method, a gas turbine with a processor and transducers arranged to carry out such a method is disclosed.

17 Claims, 4 Drawing Sheets

(51) Int. Cl.
    *G01M 15/14*    (2006.01)
    *G01K 11/24*    (2006.01)
    *G01K 13/02*    (2006.01)
    *F02C 6/00*     (2006.01)

(56) References Cited

U.S. PATENT DOCUMENTS

| | | | | |
|---|---|---|---|---|
| 4,596,133 A | * | 6/1986 | Smalling | G01F 1/662 |
| | | | | 73/24.01 |
| 4,754,650 A | * | 7/1988 | Smalling | G01F 1/662 |
| | | | | 73/861.28 |
| 4,848,924 A | | 7/1989 | Nuspl et al. | |
| 4,856,321 A | * | 8/1989 | Smalling | G01F 1/662 |
| | | | | 73/40.5 A |
| 5,437,506 A | | 8/1995 | Gray | |
| 5,537,854 A | * | 7/1996 | Phillips | G01N 29/024 |
| | | | | 123/395 |
| 5,697,346 A | * | 12/1997 | Beck | F02D 19/061 |
| | | | | 123/1 A |
| 6,487,916 B1 | * | 12/2002 | Gomm | G01F 1/667 |
| | | | | 73/861.27 |
| 8,146,657 B1 | * | 4/2012 | Gibbs | E21B 47/10 |
| | | | | 166/250.03 |
| 9,212,956 B2 | * | 12/2015 | Skliar | G01K 11/22 |
| 2002/0124630 A1 | | 9/2002 | Jaeschke et al. | |
| 2005/0066744 A1 | * | 3/2005 | Kupnik | G01F 1/662 |
| | | | | 73/861.03 |
| 2005/0229909 A1 | * | 10/2005 | Nakazawa | F02D 13/0261 |
| | | | | 123/568.14 |
| 2012/0150413 A1 | | 6/2012 | Bunce et al. | |
| 2012/0247115 A1 | * | 10/2012 | Sasahara | F02C 6/18 |
| | | | | 60/772 |
| 2014/0064326 A1 | * | 3/2014 | Claussen | G01K 13/02 |
| | | | | 374/117 |
| 2014/0278200 A1 | * | 9/2014 | DeSilva | G01K 15/005 |
| | | | | 702/130 |
| 2015/0089950 A1 | * | 4/2015 | Schuermans | F23N 5/16 |
| | | | | 60/722 |
| 2015/0168190 A1 | * | 6/2015 | DeSilva | G01M 15/14 |
| | | | | 60/734 |
| 2015/0168230 A1 | * | 6/2015 | DeSilva | G01K 11/24 |
| | | | | 374/117 |
| 2015/0185089 A1 | * | 7/2015 | DeSilva | G01K 11/24 |
| | | | | 73/112.01 |
| 2015/0260557 A1 | * | 9/2015 | DeSilva | G01M 15/14 |
| | | | | 702/48 |
| 2015/0260611 A1 | * | 9/2015 | DeSilva | G01M 15/14 |
| | | | | 73/112.01 |
| 2015/0260612 A1 | * | 9/2015 | DeSilva | G01M 15/14 |
| | | | | 702/48 |
| 2016/0109304 A1 | * | 4/2016 | Yan | G01K 11/24 |
| | | | | 374/1 |

FOREIGN PATENT DOCUMENTS

| | | |
|---|---|---|
| EP | 2 239 641 | 10/2010 |
| GB | 1 219 047 | 1/1971 |
| JP | 2001153733 | 6/2001 |

* cited by examiner

GAS TURBINE TEMPERATURE MEASUREMENT

CROSS-REFERENCE TO RELATED APPLICATIONS

This application claims priority to European application 12194772.5 filed Nov. 29, 2012, the contents of which are hereby incorporated in its entirety.

TECHNICAL FIELD

The invention relates to temperature measurements in the pressurized flow path of a gas turbine and the use of such a measurement in the control of a gas turbine as well as a gas turbine comprising such a measurement.

BACKGROUND

Different temperature measurements for Gas turbines are known. Typically these are based on thermo couples or resistance thermometers. However, due to the harsh environment in a gas turbine they need to be capsuled for use in the pressurized flow path and are therefore relatively slow to detect transient changes in temperatures. Further, the hot gas temperatures in gas turbines are often too high for the use of direct measurements.

Optical pyrometers have also been used as a way to take spot readings (primarily in combustion zones). Optical pyrometers have not been widely used as continuous measurement devices in gas turbines. They do not work well below about 900° C. and would not be useful for monitoring during start-up and at low load. Further, optical access is difficult to the pressurized part of the gas turbine flow path.

The concept of measuring temperature based on the propagation speed of acoustic waves has been known for a long time. However, engine noise has so far prevented the use such a concept.

SUMMARY

One aspect of the present disclosure is to provide a method for determining a temperature in a pressurized flow path of a gas turbine using the concept of measuring temperature based on the propagation speed of acoustic waves.

The speed of sound through a gas depends on its specific heat ratio, the specific gas constant, and absolute temperature as follows:

$$c = (\kappa * R_{spec} * T)^{0.5}$$

where:
c is the speed of sound [m/s],
κ is the specific heat ratio [–],
T is the absolute temperature [K],
$R_{spec} = R/M$
with:
the universal gas constant R, [8.314 J K$^{-1}$ mol$^{-1}$], and
the molecular mass M [g/mole] of the gas.

According to a first embodiment a temperature in a pressurized flow path of a gas turbine downstream of a compressor and upstream of a turbine comprises the following steps:

sending an acoustic signal from an acoustic signal emitting transducer arranged to send an acoustic signal across at least a section of a cross section of the pressurized flow path, detecting the acoustic signal with a receiving transducer arranged to receive the acoustic signal after the acoustic signal crossed the section, measuring the time needed by the acoustic signal to travel from the acoustic signal emitting transducer to the receiving transducer, calculating the speed of the acoustic signal, i.e. the speed of sound in the section passed by the acoustic signal, based on the measured traveling time and distance between acoustic signal emitting transducer and the receiving transducer, providing a heat capacity ratio and a specific gas constant of the gas flowing in the pressurized flow path, and calculating the temperature of the gas in the section of the pressurized flow path as a function of the speed of sound, the heat capacity ratio and a specific gas constant of the gas flowing in the pressurized flow path.

In this context "arranged to send an acoustic signal across at least a section of a cross section of the pressurized flow path" for example means that the acoustic signal emitting transducer is installed such that the acoustic signal emitting end of the transducer is directed in the direction of the section which the acoustic signal shall pass. Preferably it is installed flush with the side wall of the flow path to avoid turbulences, which can interfere with the acoustic signal. "Arranged to receive the acoustic" signal typically means that the receiving transducer is installed in line of sight of the emitting transducer or in line of sight of an acoustic wave directly reflected from a wall of the flow path.

According to one embodiment the combustion pulsation pressure is measured over frequency, and the maximum pulsation pressure is determined. To facilitate detection of the acoustic signal the frequency of the acoustic signal emitting transducer is tuned to a frequency, with a combustion pulsation pressure, which is less than 20% of the maximum pulsation pressure. Preferably, the frequency of the acoustic signal emitting transducer is tuned to a frequency, with a pulsation pressure, which is less than 10% of the maximum pulsation pressure.

For better accuracy the signal received by the receiving transducer can be filtered for combustor pulsation and/or noise produced by the gas turbine. The combustor pulsations and/or noise can be recorded with the transducers used for determining the acoustic signal. The pulsation and/or noise produced by the gas turbine can also be measured at other locations, which can be at a distance from the acoustic receiving transducer and the measured signal. For better separation of the pulsation signal from the emitted acoustic signal the signal can be transferred to the location of the receiving transducer. For this transfer the distance and traveling time between the remote location and receiving transducer has to be taken into account.

According to one embodiment the acoustic signal send by the acoustic signal emitting transducer can be pulsed, i.e. it is only send intermittently to create a short acoustic peak. This facilitates distinction of the acoustic signal over the engine noise and pulsations. Preferably a short peak with a steep onset and abrupt end is used. Ideally the emitting transducer emits at maximum amplitude from the first acoustic wave it emits. The traveling time can be determined by the time it takes from emitting the first wave to the time an increase in the sound level at the emitted frequency is recognized by the receiving transducer. In this case a single acoustic wave can be sufficient. The pulse interval, i.e. the time between sending pulsed acoustic signals, can be in the order of several (at least two) times a wave length divided by the speed of sound to the order of seconds. It can for example be in the order of the time required by an acoustic signal to travel from the emitting to the receiving transducer.

According to a further embodiment the acoustic signal send by the acoustic signal emitting transducer can be modulated, i.e. its frequency is changed continuously or with step-wise jumps. This facilitates distinction of the acoustic signal over the engine noise and pulsations.

According to a further embodiment the pulsation pressure is measured as a function of the frequency. This can be done over a wide frequency range until a quit frequency is detected and the frequency of the acoustic signal emitting transducer is tuned to such a quiet frequency, which is free of pulsations and/or engine noise.

To reduce the energy needed for the speed measurement and to avoid unnecessary additional sound generation the pulsation pressure can be measured at the emitting frequency used for the acoustic signal emitting transducer and the acoustic signal pressure emitted by the acoustic signal emitting transducer is controlled to a predetermined multiple of the pulsation pressure at the emitting frequency. For short distances between the emitting and receiving transducer and when applying noise filtering the sound pressure of the acoustic signal can be smaller than the sound pressure of the engine noise. Preferably a sound pressure of less than 1 time down to 0.3 times the engine noise's sound pressure can be used. In this context, typically a distance of one to three times the flow channel height can be considered as a small distance.

According to another embodiment the pulsation probe used to monitor combustor pulsations is also used as receiving transducer to determine the speed of sound.

According to a further embodiment the same transducer is used for emitting of the acoustic signal and for receiving the acoustic signal. In this case the transducer receives the signal reflected by a part of the gas turbine. This can for example be an inner wall of the flow path if the transducer is installed at an outer wall. It can also be reflected at an outer wall if the transducer is installed at an inner wall.

The use of acoustic temperature measurement has been described for measurements in gases. Typically, those measurements were carried out in air or gases with a given composition. However, in gas turbine operation the boundary conditions including the gas composition can change considerably. For example the oxygen content at the downstream end of a sequential combustor (second combustor) of a gas turbine can be close to the oxygen content of ambient air at part load operation (only reduced by one to two percent) and can be reduced to practically zero at base load operation with flue gas recirculation. Neglecting the changes in gas composition can lead to a noticeable measurement error. To avoid such measurement error it is suggested to determine the gas composition of the gas flowing in the pressurized flow path and to determine the heat capacity ratio κ and/or specific gas constant $R_{spec}$ determined based on the gas composition. The temperature measurement is than based on the determined heat capacity ratio κ and/or specific gas constant $R_{spec}$.

Measurement of the gas composition in the pressurized gas path of a gas turbine, in particular of the hot gases of a combustion chamber at required temperature measurement locations is difficult to realize. According to one embodiment for determining a temperature it is therefore suggested to determine or measure the gas composition of the compressor inlet gas, the pressurized gas or the exhaust gas. The measured or determined composition is corrected for changes in compositions due to addition of fluids and/or changes in composition due to combustion between the measurement point and the section in which the speed of acoustic signal is determined.

Added fluids can for example be a fuel added in a burner, a water or steam flow added in a burner for emission control or power augmentation, a water or steam flow added to a compressor plenum for power augmentation, or water added for inlet cooling and/or high fogging (i.e. an overspray of water into the intake gas beyond saturation, also known as wet compression) into the compressor or upstream of the compressor inlet. Further, the influence of flue gas recirculation (if applicable) on the composition of the inlet gases can be considered.

If the flue gas composition of the exhaust gases are measured the flue gas composition upstream of a flame can be determined correspondingly by subtracting the influence of fluid added between the measurement point of the gas composition and the cross section at which the gas temperature is determined.

For indirect determination of the gas composition the added fluid flows and the gas flows inside the gas turbine have to be known. These can change considerably for different operating conditions and can be difficult to determine. Further, the measurement of a gas composition is typically slow and requires a large expensive measurement setup. To avoid expensive measurements of the gas composition and related uncertainties a method of estimating the gas composition based on the measured temperature is proposed.

According to this embodiment the method for determining a temperature further comprises an approximation for the gas composition. The proposed approximation is used to determine the change in gas composition due to combustion in the pressurized flow path. The change in gas composition is proportional to the amount of fuel burnt. Since the temperature increase due to combustion is also proportional to the amount of fuel burnt, the change in composition can be determined as a function of the temperature increase due to combustion. Based on a starting value for the gas composition and on the measured speed of sound in a cross section downstream of the combustion, the hot gas temperature after combustion can be estimated. This temperature combined with a temperature measurement upstream of the combustion can be used to determine the temperature increase. This temperature increase gives a first iteration on the change of gas composition due to combustion. Based on a known (for example for ambient air), measured or estimated gas composition upstream of the combustion chamber and on the determined change in gas composition an iterated gas composition after combustion can be determined. This leads to a better temperature measurement, which again can be used for iteration of the temperature increase and for the gas composition. This iteration can be repeated until a convergence criterion is met. Typically the convergence criterion is predetermined. It can also be a function of an operating parameter, e.g. a percentage of the operating temperature or of the measured gas composition. It can also depend on the operating condition, e.g. a small value for steady state operation and a larger value for transient operation, such as for example load changes or frequency response operation.

A starting value for the gas composition can for example be a typical base load composition or estimated based on the relative load of the gas turbine.

According to one embodiment the iteration for approximating the gas composition of the gas flowing in the pressurized flow path comprises the steps of:

a) measuring the temperature upstream of the flame,
b) determining the gas composition upstream of the flame,
c) taking a starting value for the gas composition downstream of the flame,
d) determining the heat capacity ratio κ and/or specific gas constant $R_{spec}$ for the starting composition,
e) determining the hot gas temperature $T_{rot}$ after the flame based on the measured propagation speed of the acoustic signal, the heat capacity ratio κ and specific gas constant $R_{spec}$ for the starting composition,
f) calculating the temperature increase in the combustor in the flame as a temperature difference ΔT between the hot gas temperature $T_{hot}$ after the flame and the temperature upstream of the flame $T_2$,
g) determining the change in gas composition during combustion based on the temperature increase in the combustor ΔT, a fuel composition and calculating the hot gas composition based on the gas composition upstream of the flame and on the change in gas composition during combustion,
h) determining corrected iterated heat capacity ratio $κ_i$ and/or specific gas constant $R_{spec,i}$,
i) recalculating an iterated hot gas temperature $T_{hot,i}$ after the flame based the iterated heat capacity ratio $κ_i$ and/or specific gas constant $R_{spec,i}$, and
j) continue iterating at step e) until a convergence criterion is met.

A convergence criterion can be a difference between the latest iterated gas composition or temperature and the value of the previous iteration. Typically, a change in an iterated value which is smaller than 1% of the absolute value is a sufficient convergence criterion.

Typically, temperature measurements upstream of a combustion chamber such as a compressor exit temperature are available and reliable. For air breathing gas turbines the inlet gas composition is also known.

For control and supervision of a gas turbine it is useful to not only know the temperature at a specific location but to determine the temperature average and/or to determine a temperature distribution or temperature profile. According to one embodiment a plurality of transducers is used to determine an average temperature in the cross section and/or to determine a temperature profile in the cross section.

To avoid interference of acoustic signals send from multiple transducers different frequencies can be used for neighboring emitting transducers. According to one embodiment using multiple transducers to measure the acoustic signal pulsed and/or modulated acoustic signals are used. These can be sent with a time shift or according to a predetermined sequence to enable distinction of the signals traveling different paths.

Besides the method of determining a temperature based on the measured speed of sound in the in part of flow path of the gas turbine downstream of a compressor and upstream of a turbine, the use of this temperature in a method for controlling a gas turbine is an object of the disclosure.

Further, a gas turbine configured to carry out a method to determine a temperature and is operated using the temperature is an object of the disclosure.

According to one embodiment such a gas turbine has at least a compressor, a compressor plenum, a burner, a combustion chamber, a turbine, and a processor for the temperature measurement, and comprises at least one acoustic signal emitting transducer and receiving transducer installed in part of flow path of the gas turbine downstream of a compressor and upstream of a turbine, which is pressurized in operation. For the temperature measurement the processor is configured to send a command to the acoustic signal emitting transducer causing it to send a predetermined acoustic signal across at least a section of a cross section of the pressurized flow path. The receiving transducer is arranged to detect the acoustic signal and to send a corresponding signal to the processor. Further, the processor is configured to calculate the speed of sound based on the measured traveling time and a given distance between acoustic signal emitting transducer and the acoustic signal receiving transducer, and to calculate the temperature of the gas in the section of the pressurized flow path as a function of the speed of sound, and a heat capacity ratio κ and a specific gas constant $R_{spec}$ of the gas provided to the processor.

According to a further embodiment at least one acoustic signal emitting and receiving transducer is installed the compressor plenum to measure the compressor exit temperature. Additionally or alternatively at least one acoustic signal emitting and receiving transducer is installed in the burner. This allows measurement of the inlet temperature to the burner or combustion chamber before combustion takes place. In a gas turbine with sequential combustion this allows measurement of the exhaust temperature of the first turbine. Additionally or alternatively at least one acoustic signal emitting and receiving transducer is installed in the combustion chamber to measure the hot gas temperature.

Different arrangements of the acoustic transducers are conceivable. According to one embodiment of the gas turbine at least one acoustic signal emitting transducer is installed on an inner wall of the pressurized flow path and at least one receiving transducer is installed on an outer wall of the pressurized flow path. Alternatively or in combination at least one acoustic signal emitting transducer can be installed on an outer wall of the pressurized flow path and at least one receiving transducer can be installed on an inner wall of the pressurized flow path. In another embodiment the at least one acoustic signal emitting transducer and receiving transducer is installed on an outer wall of the pressurized flow path. In yet another embodiment the least one acoustic signal emitting transducer and at least one receiving transducer is installed on an inner wall of the pressurized flow path.

In a further embodiment of the gas turbine the processor is configured to determine engine noise level and to filter or separate the pulsation and noise from the acoustic signal.

For filtering or separating the acoustic signal from the pulsation signal the signal of a receiving transducer is transformed into the frequency ranges for example by Fast Fourier Transform (FFT). This transformation gives a spectrum with a number of frequency bands (amplitudes in a small frequency range). The number of bands can for example be in the range of 100 to 1000, up to 2000 or more bands.

Preferably the band frequencies are maintained very precisely and the signal permeability within the band, or signal blocking outside the band is ideal as desired in accordance with the utilized system performance (for example computer performance). An "acoustic-frequency signal" in the present context is intended to mean a signal that represents the amplitudes of the acoustic signal in dependence on the frequency. From an acoustic-frequency signal of this type it is particularly easy to obtain specified monitoring frequency bands. Additionally, the frequency bands can be selected ideally narrow in accordance with the utilized system performance (computer performance), permitting a targeted and separate monitoring of certain acoustic frequencies without distorting their amplitudes. The invention, in this context, is also based on the realization that interfering engine noise or pulsation frequencies may lie relatively close to acoustic-signal frequencies, so that a comparatively broad conventional monitoring frequency band, due to the nature of the system, also detects noise or pulsation frequencies and accordingly cannot distinguish the acoustic signal from the pulsation frequencies, and a distortion, especially a swelling, of the amplitudes of certain pulsation frequencies occurs as well. The width of the monitoring frequency bands in the case of an acoustic-time signal by means of conventional band pass filters (Tchebychev or the like) cannot be selected arbitrarily small. Due to the technical characteristics of these band filters, the effect of this is more pronounced, the greater the frequencies that need to be filtered out. The monitoring frequency bands in the case of the acoustic-frequency signal, in contrast, can be selected ideally narrow in accordance with the utilized system performance, so that it is especially possible to exclude closely adjacent pulsation frequencies from the signal monitoring process. Additionally, in a preferred embodiment, a dynamic adaptation of the system parameters (especially band pass limits, time constants, etc.) may be performed to various operating conditions of the gas turbine, for example normal operation, startup, unloading, fuel change, etc.

Accordingly, a processor configured to determine the engine's combustor pulsation i.e. the combustor pulsation pressure and to separate the pulsation signal from the acoustic signal can transform the signal received from a receiving transmitter into bands and is configured to monitor the amplitude in at least one defined frequency band.

The global minimum of the amplitude in all intervals of the sound spectrum can be determined and the acoustic signal emitting transducer can be tuned to a frequency in this interval.

To further enhance the measurement quality and reliability a measurement time window can be defined. The beginning of the measurement window can be triggered by when a pulsed acoustic signal is send from the acoustic signal emitting transducer. The measurement window can start with a time delay taking into account a minimum traveling time of the acoustic signal and end at a maximum traveling time of the acoustic signal.

The proposed combustor transition can be used for new gas turbines as well as for retrofitting existing gas turbines. A method for retrofitting a gas turbine comprises the steps of opening the gas turbine housing, installing at least one acoustic signal emitting transducer and at least one receiving transducer on a wall of the pressurized flow path, and of closing the gas turbine housing.

The above gas turbine can be a single combustion gas turbine or a sequential combustion gas turbine as known for example from EP0620363 A1 or EP0718470 A2. The disclosed method and use as well as retrofit method can also be applied to a single combustion gas turbine or a sequential combustion gas turbine.

BRIEF DESCRIPTION OF THE DRAWINGS

The invention, its nature as well as its advantages, shall be described in more detail below with the aid of the accompanying drawings. Referring to the drawings.

DETAILED DESCRIPTION

The same or functionally identical elements are provided with the same designations below. The examples do not constitute any restriction of the invention to such arrangements.

Figure 1:
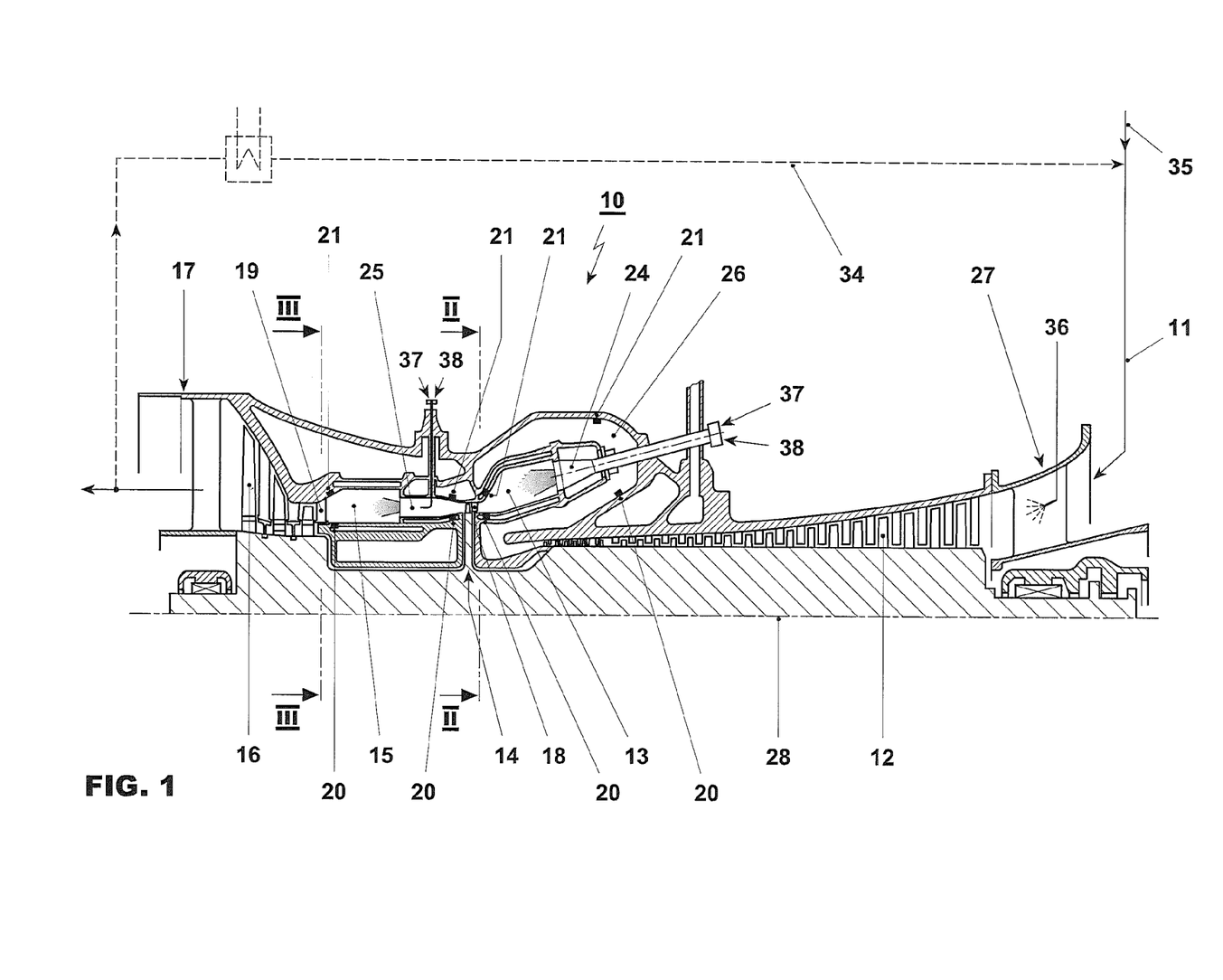
FIG. 1 schematically shows an example of a gas turbine according to the present invention.

An exemplary arrangement is schematically shown in FIG. 1. The gas turbine 10 is supplied with compressor inlet gas 11. In the gas turbine 10 a compressor 12 is followed by a first combustor comprising a first burner 24 and a first combustion chamber 13. In the first burner 34 fuel 37 is added to the compressed gas and the mixture burns in the first combustion chamber 13. Hot combustion gases are fed from the first combustion chamber 13 into a first turbine 14 which is followed by a second combustor comprising a sequential burner 25 (also known as second burner) and a sequential combustion chamber 15 (also known as second combustion chamber). Fuel 37 can be added to the gases leaving the first turbine 14 in the sequential burner 35 and the mixture burns in the sequential combustion chamber 15. Hot combustion gases are fed from the sequential combustion chamber 15 into a second turbine 16.

Steam and/or water 38 can be injected into the first and/or sequential burner for emission control and to increase the power output. Water 36 can also be injected into the compressor or upstream of the compressor for inlet cooling and power augmentation.

In the example shown in FIG. 1 transducers 20, 21 are arranged in the compressor plenum 26, and the sequential burner 25 to measure the inlet temperature of the first, respectively the sequential combustion chamber 13, 15. To measure the hot gas temperature at vane one 18 of first turbine 14, respectively at vane one 19 of the second turbine 16 transducers 20, 21 are arranged in the downstream end region of first and sequential combustion chamber 13, 15, respectively. Transducers 20 are arranged on the inner walls towards the machine axis 28 and transducers 21 are arranged on the outer walls towards the casing 17 of the gas turbine.

Exhaust gas 17 leaves the second turbine 16. The exhaust gas 17 is typically used in a heat recovery steam generator to generate steam for cogeneration or for a water steam cycle in a combined cycle (not shown).

Optionally, part of the exhaust gas 17 can be branched off in a flue gas recirculation 34 (typically downstream of heat recovery steam generator) and admixed to the inlet air 35. Typically the recirculation 34 comprises a recooler for cooling the recirculated flue gas.

Figure 2A:
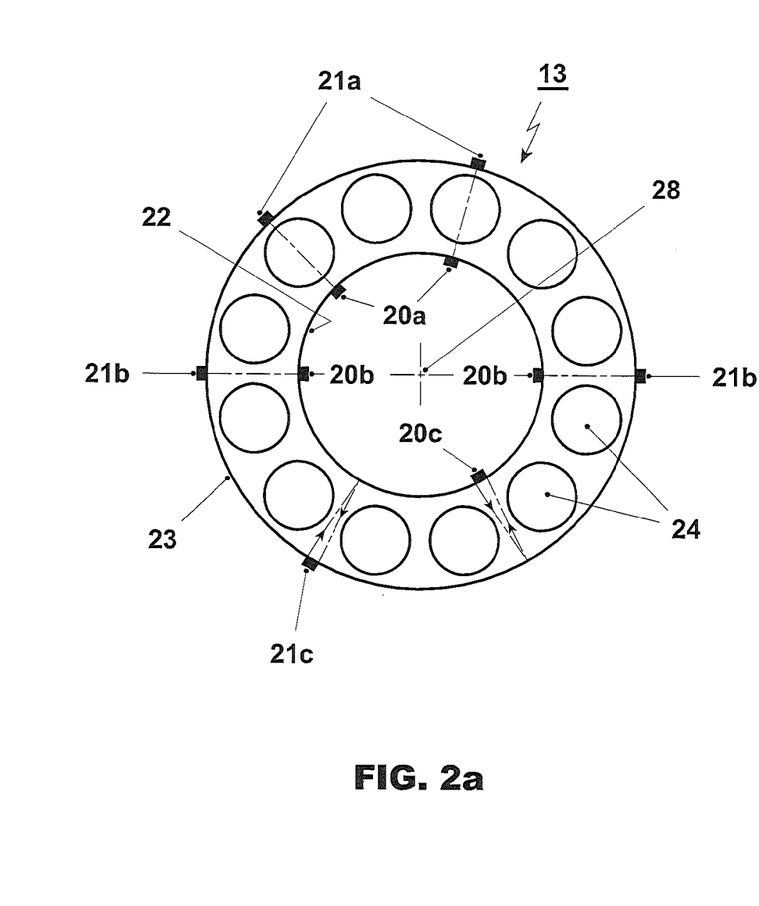
FIG. 2a schematically shows the cross section II-II of the first combustion chamber of the gas turbine from FIG. 1 with exemplary arrangements of transducers for measurement of a temperature.

FIG. 2a schematically shows the cross section II of the first combustion chamber 13 of the gas turbine 10 from FIG. 1 with first exemplary arrangements of transducers 20, 21.

In a first example the acoustic signal emitting transducers and receiving transducers 20a, 21a are arranged on the inner wall 22, respectively outer wall 24 of the first combustion chamber 13 such that they face each other at the same circumferential position. In each case they are arranged downstream of a first burner 24.

In a second example the acoustic signal emitting transducer and receiving transducers 20b, 21b are arranged on the inner wall 22, respectively outer wall 24 of the first combustion chamber 13 such that they face each other at the same on circumferential position. In each case they are arranged downstream and between two first burners 24.

In a third example the acoustic signal emitting transducer and receiving transducer is combined in one device 20c, 21c. The transducer 20c is arranged on the inner wall 22, respectively the transducer 21c on the outer wall 24 of the first combustion chamber 13. The acoustic signal send by a transducer 20c, 21c is reflected by the opposite side wall facing the transducer, and the reflected acoustic signal is detected by the transducer 20c, 21c.

Figure 2B:
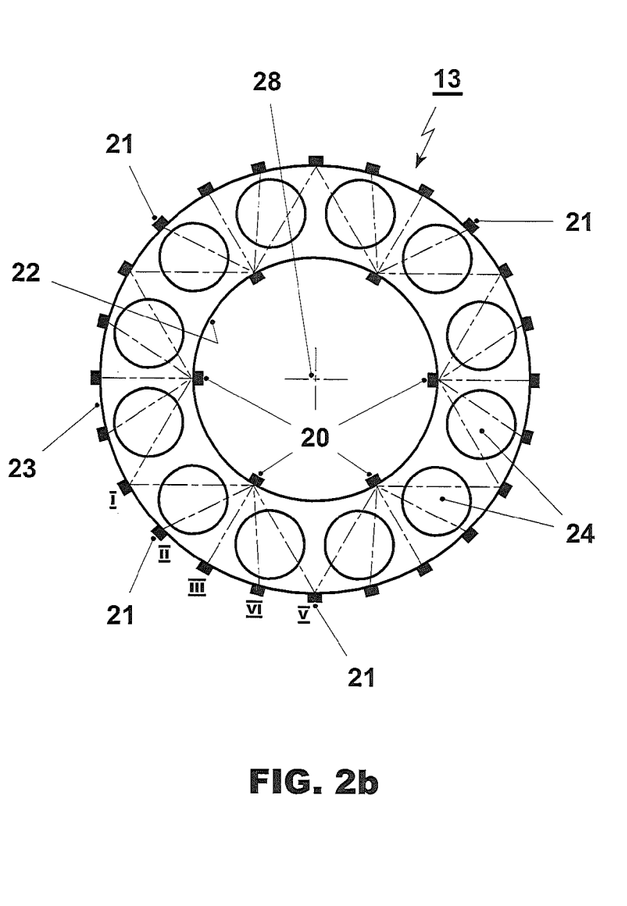
FIG. 2b schematically shows the cross section II-II of the first combustion chamber of the gas turbine from FIG. 1 with an exemplary arrangement of transducers for measurement of a temperature profile.

FIG. 2b shows a cross section of the first combustion chamber 13 of the gas turbine 10 from FIG. 1 with exemplary arrangements of transducers 20, 21 for measurement of a temperature profile.

The acoustic signal emitting transducer 20 can for example be arranged circumferentially distributed along the inner wall 22 of the first combustion chamber 13. The receiving transducers 21 can for example be arranged circumferentially distributed along the outer wall 23 of the first combustion chamber 13. For each acoustic signal emitting transducer 20 a plurality of receiving transducers 21 i, ii, ii . . . v is arranged along a section of the outer wall 23 facing a corresponding acoustic signal emitting transducer 20. The average speed of sound between each acoustic signal emitting transducer 20 and corresponding receiving transducers 21 i, ii, ii . . . v can be measured and the corresponding temperature can be derived, thus leading to a temperature distribution. An average temperature can be calculated based on the individual measurements for the section between the emitting transducer 20 and each receiving transducer 21 i, ii, ii . . . v. For temperature averaging the mass flow passing each section can be used.

The acoustic signal emitting transducer 21 can also be distributed on the outer wall 23 and the receiving transducers 20 on the inner wall 22. In an alternative embodiment the plurality of transducers 21 i, ii, ii, v can also be acoustic signal emitting transducer 21 and the transducer 20 a receiving transducer.

If the acoustic signal from more than one acoustic signal emitting transducer 20, 21 is received by a receiving transducer 20, 21 a synchronization of the acoustic signal emitting transducers 20, 21 can be advantageous to easier allocate the received signal to the emitted acoustic signals. Alternatively a sequenced pulsing of the acoustic signal emitting transducers can be carried out.

In a further alternative different emitting frequencies are used for the plurality of acoustic signal emitting transducers 20, 21.

For any arrangement with a plurality of acoustic signal emitting transducers different frequencies for the different acoustic signal emitting transducers can be used. Also frequency modulations of the acoustic signal emitting transducers can be applied. The modulations of the different acoustic signal emitting transducers can be time shifted to facilitate allocation of the received signals to the emitting transducers.

Figure 2C:
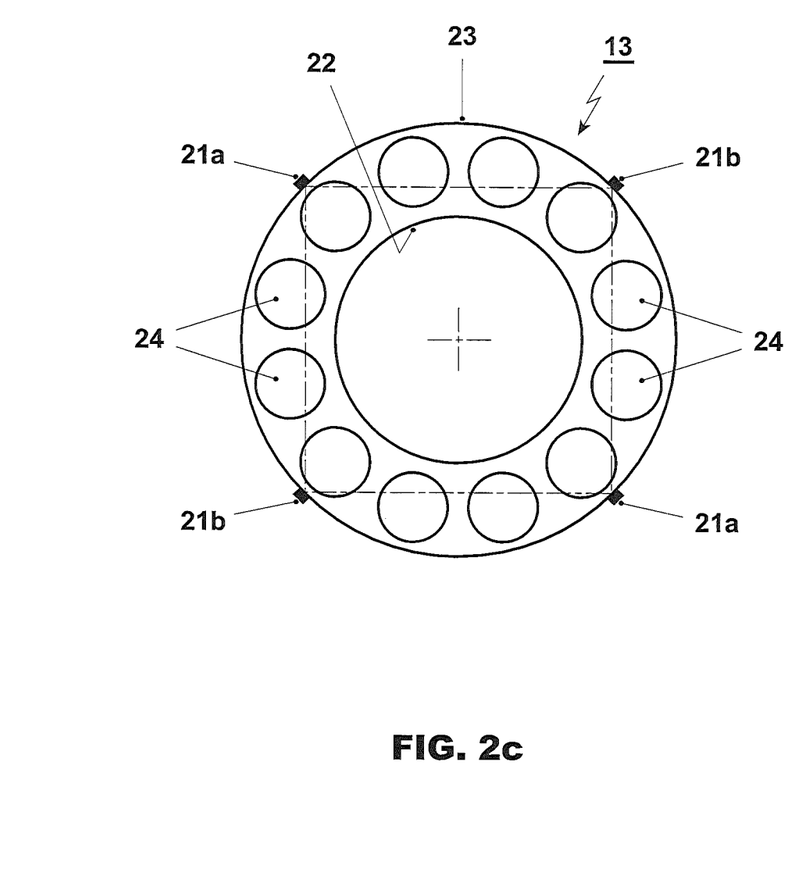
FIG. 2c schematically shows the cross section II-II of the first combustion chamber of the gas turbine from FIG. 1 with an exemplary arrangement of transducers for measurement of averaged temperatures.

FIG. 2c shows a cross section of the first combustion chamber 13 of the gas turbine 10 from FIG. 1 with exemplary arrangements of transducers 20, 21 for measurement of averaged temperatures.

In this example the acoustic signal emitting transducers 21a are arranged in opposite locations on the outer wall 23 of the annular cross section of the combustion chamber 13. Between two acoustic signal emitting transducers 21a a receiving transducer 21b is arranged on the outer wall 23. In this example the flow path of the combustion chamber 13 is high enough that in an equidistant alternating arrangement of two acoustic signal emitting transducers 21a and two receiving transducers 21b on the outer wall 23 can be arranged such that each receiving transducer is in a line of sight of the neighboring acoustic signal emitting transducers 21a. The average speed of sound and thereby the average temperature along each line of sight can be determined with this arrangement. The overall average temperature can be estimated by averaging the temperatures determined for all for sections.

Figure 3:
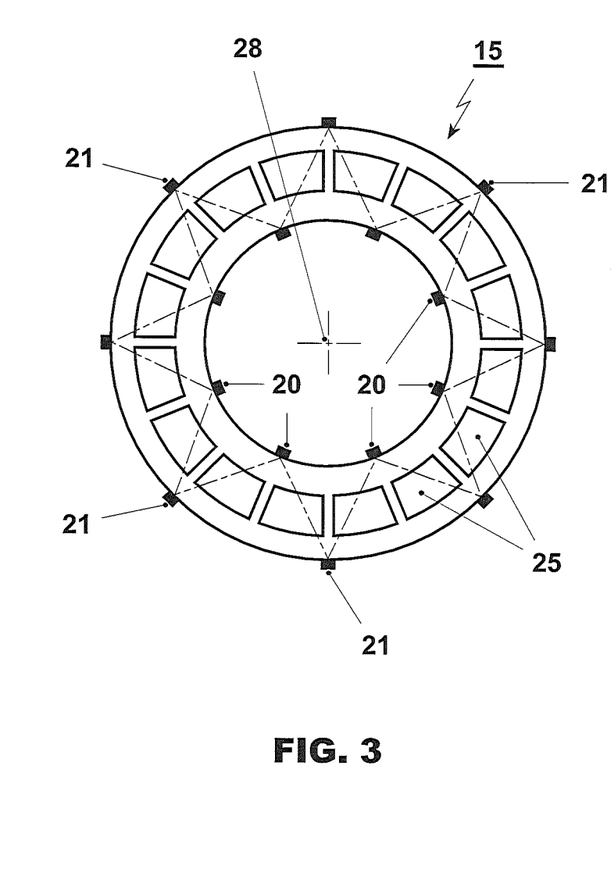
FIG. 3 schematically shows the cross section III-III of the sequential combustion chamber of the gas turbine from FIG. 1 with an exemplary arrangement of transducers for measurement of a temperature profile.

In FIG. 3 the cross section III-III of the sequential combustion chamber of the gas turbine from FIG. 1 is schematically shown. It shows another exemplary arrangement of transducers 20, 21 for measurement of a temperature distribution. At a location between every other sequential burner 25 a transducer 21 is arranged on the outer wall and staggered relative to the transducers 20 on the inner wall. The transducers 20 are arranged on the inner wall at a location between every other sequential burner 25. The acoustic signal emitting transducers can be arranged on the outer wall and the receiving transducers on the inner wall or vice versa. The average temperature can be determined for each section between each acoustic signal emitting transducers 20, 21 and receiving transducer 20, 21 for each sequential burner 25 leading to a temperature distribution in circumferential direction. The average hot gas temperature can be calculated based on the individual averages downstream of each sequential burner 25.

Figure 4:
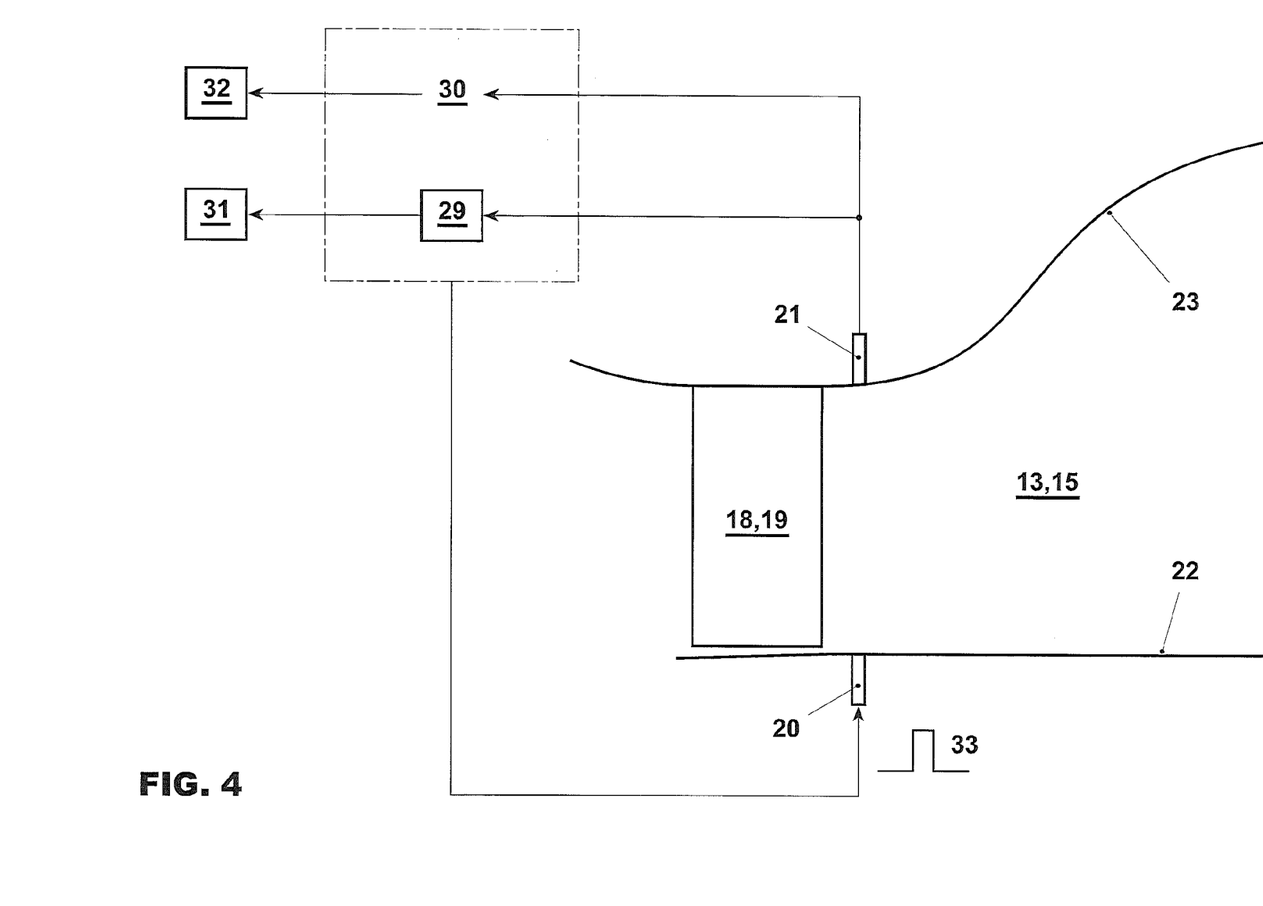
FIG. 4 schematically shows an exemplary arrangement of transducers connected to a processor for determining the temperature upstream of the first or second turbine of a gas turbine.

FIG. 4 shows an exemplary arrangement of transducers connected to a processor for determining the temperature upstream of the vane one 18, 19 of turbine a gas turbine. The processor 30 controls an acoustic signal emitting transducer 20 arranged on the inner wall 22 of the combustion chamber 13, 15 of the gas turbine. It is controlled to send a pulsed sound 33. The receiving transducer 20, 21 detects the sound pressure on the outer wall 23 of the combustion chamber 13, 15 converts it into an electric or optical signal and transmits the measured value to the processor 30. The processor 30 filters the signal corresponding to the emitted acoustic signal. Based on the filtered signal corresponding to the emitted acoustic signal the hot gas temperature 32 is determined and used for the gas turbine control. Based on the acoustic sound level 29 a pulsation signal 31 is determined and used for control and protection of the gas turbine.

The arrangements shown as example for the first combustor in FIGS. 2a to 2c can be directly applied to a second combustor, and the example for FIG. 3 can be directly applied to a first combustor.

In the FIG. 2a) to 2c) and FIG. 3 examples with annular combustion chambers are shown. The disclosed method can analogously be applied to gas turbines with can combustors. Transducers in burners as well as in can combustors do not have to be placed on inner, respectively outer walls but can be placed anywhere on the perimeter of the burner or combustion chamber.

The invention claimed is:

1. A method for determining a temperature in a pressurized flow path of a gas turbine downstream of a compressor and upstream of a turbine, comprising:
   sending an acoustic signal from an acoustic signal emitting transducer arranged to send an acoustic signal across at least a section of a cross section of the pressurized flow path;
   detecting the acoustic signal with a receiving transducer arranged to receive the acoustic signal after the acoustic signal crossed the section;
   measuring the time needed by the acoustic signal to travel from the acoustic signal emitting transducer to the receiving transducer;
   calculating the speed of sound based on the measured traveling time and distance between acoustic signal emitting transducer and the receiving transducer;
   providing a heat capacity ratio ($\kappa$) and a specific gas constant ($R_{spec}$) of a gas flowing in the pressurized flow path; and
   calculating the temperature of the gas in the section of the pressurized flow path as a function of the speed of sound, the heat capacity ratio ($\kappa$) and the specific gas constant ($R_{spec}$) of the gas flowing in the pressurized flow path, wherein a combustion pulsation pressure is measured over frequency, a maximum pulsation pressure is determined, and a frequency of the acoustic signal emitting transducer is tuned to a frequency, with a combustion pulsation pressure, which is less than 20% of the maximum pulsation pressure.

2. The method for determining a temperature according to claim 1, wherein the combustion pulsation pressure is measured as a function of the frequency of the acoustic signal emitting transducer and the frequency of the acoustic signal emitting transducer is tuned to a frequency, which is free of pulsations and/or engine noise.

3. The method for determining a temperature according to claim 1, wherein the signal received by the receiving transducer is filtered for noise produced by the gas turbine and/or the acoustic signal sent by the acoustic signal emitting transducer is pulsed or sent with a frequency modulation.

4. The method for determining a temperature according to claim 1, wherein the combustion pulsation pressure is measured at an emitting frequency of the acoustic signal emitting transducer, and an acoustic signal pressure emitted by the acoustic signal emitting transducer is controlled to a predetermined multiple of the combustion pulsation pressure at the emitting frequency.

5. The method for determining a temperature according to claim 1, wherein gas composition of the gas flowing in the pressurized flow path is determined and the heat capacity ratio ($\kappa$) and/or specific gas constant ($R_{spec}$) is determined based on the gas composition.

6. The method for determining a temperature according to claim 1, wherein the gas composition of the gas flowing in the pressurized flow path is approximated by an iteration, comprising:
   a) measuring the temperature upstream of a flame of combustion of the gas turbine;
   b) determining the gas composition upstream of the flame;
   c) using a starting value for the gas composition downstream of the flame;
   d) determining the heat capacity ratio ($\kappa$) and/or specific gas constant ($R_{spec}$) for the starting composition;
   e) determining the hot gas temperature ($T_{hot}$) after the flame based on the measured propagation speed of the acoustic signal, the heat capacity ratio ($\kappa$) and specific gas constant ($R_{spec}$) for the starting composition;
   f) calculating the temperature increase in the combustor in the flame as a temperature difference ($\Delta T$) between the hot gas temperature ($T_{hot}$) after the flame and the temperature upstream of the flame ($T_2$);
   g) determining the change in gas composition during combustion based on the temperature increase in the combustor ($\Delta T$), a fuel composition and calculating the hot gas composition based on the gas composition upstream of the flame and on the change in gas composition during combustion;
   h) determining corrected iterated heat capacity ratio ($\kappa_i$) and/or specific gas constant ($R_{spec,i}$);
   i) recalculating an iterated hot gas temperature ($T_{hot,i}$) after the flame based the iterated heat capacity ratio ($\kappa_i$) and/or specific gas constant ($R_{spec,i}$); and
   j) continue iterating at step e) until a convergence criterion is met.

7. The method for determining a temperature according to claim 1, comprising:
   a plurality of transducers used to determine an average temperature in the cross section and/or to determine a temperature profile in the cross section.

8. The method for determining a temperature in a pressurized flow path of a gas turbine according to claim 1, wherein the frequency of the acoustic signal emitting transducer is tuned to a frequency, with a combustion pulsation pressure, which is less than 10% of the maximum pulsation pressure.

9. The method for determining a temperature according to claim 1, wherein a pulsation probe used to monitor combustor pulsations is used as receiving transducer.

10. The method for determining a temperature according to claim 9, wherein the gas composition of a compressor inlet gas, the pressurized gas or an exhaust gas is measured, and the measured composition is corrected for changes in compositions due to addition of fluids and/or changes in composition due to combustion between the measurement point and the section in which the speed of acoustic signal is determined.

11. A method for determining a temperature in a pressurized flow path of a gas turbine downstream of a compressor and upstream of a turbine, comprising:
   sending an acoustic signal from an acoustic signal emitting transducer arranged to send an acoustic signal across at least a section of a cross section of the pressurized flow path;
   detecting the acoustic signal with a receiving transducer arranged to receive the acoustic signal after the acoustic signal crossed the section;
   measuring the time needed by the acoustic signal to travel from the acoustic signal emitting transducer to the receiving transducer;
   calculating the speed of sound based on the measured traveling time and distance between acoustic signal emitting transducer and the receiving transducer;
   providing a heat capacity ratio ($\kappa$) and a specific gas constant ($R_{spec}$) of the gas flowing in the pressurized flow path; and
   calculating the temperature of the gas in the section of the pressurized flow path as a function of the speed of sound, the heat capacity ratio ($\kappa$) and the specific gas constant ($R_{spec}$) of the gas flowing in the pressurized flow path, wherein a combustion pulsation pressure is measured as a function of a frequency of the acoustic signal emitting transducer and the frequency of the acoustic signal emitting transducer is tuned to a frequency, which is free of pulsations and/or engine noise.

12. The method for determining a temperature according to claim 11, wherein the signal received by the receiving transducer is filtered for noise produced by the gas turbine and/or the acoustic signal sent by the acoustic signal emitting transducer is pulsed or sent with a frequency modulation.

13. The method for determining a temperature according to claim 11, wherein the combustion pulsation pressure is measured at an emitting frequency of the acoustic signal emitting transducer, and an acoustic signal pressure emitted by the acoustic signal emitting transducer is controlled to a predetermined multiple of the combustion pulsation pressure at the emitting frequency.

14. The method for determining a temperature according to claim 11, wherein a gas composition of the gas flowing in the pressurized flow path is determined and the heat capacity ratio ($\kappa$) and/or specific gas constant ($R_{spec}$) is determined based on the gas composition.

15. The method for determining a temperature according to claim 11, wherein the gas composition of the gas flowing in the pressurized flow path is approximated by an iteration, comprising:
 a) measuring the temperature upstream of a flame of combustion of the gas turbine;
 b) determining the gas composition upstream of the flame;
 c) using a starting value for the gas composition downstream of the flame;
 d) determining the heat capacity ratio ($\kappa$) and/or specific gas constant ($R_{spec}$) for the starting composition;
 e) determining the hot gas temperature ($T_{hot}$) after the flame based on the measured propagation speed of the acoustic signal, the heat capacity ratio ($\kappa$) and specific gas constant ($R_{spec}$) for the starting composition;
 f) calculating the temperature increase in the combustor in the flame as a temperature difference ($\Delta T$) between the hot gas temperature ($T_{hot}$) after the flame and the temperature upstream of the flame ($T_2$);
 g) determining the change in gas composition during combustion based on the temperature increase in the combustor ($\Delta T$), a fuel composition and calculating the hot gas composition based on the gas composition upstream of the flame and on the change in gas composition during combustion;
 h) determining corrected iterated heat capacity ratio ($\kappa_i$) and/or specific gas constant ($R_{spec,i}$);
 i) recalculating an iterated hot gas temperature ($T_{hot,i}$) after the flame based the iterated heat capacity ratio ($\kappa_i$) and/or specific gas constant ($R_{spec,i}$); and
 j) continue iterating at step e) until a convergence criterion is met.

16. The method for determining a temperature according to claim 11, wherein a pulsation probe used to monitor combustor pulsations is used as receiving transducer.

17. The method for determining a temperature according to claim 16, wherein the gas composition of a compressor inlet gas, the pressurized gas or an exhaust gas is measured, and the measured composition is corrected for changes in compositions due to addition of fluids and/or changes in composition due to combustion between the measurement point and the section in which the speed of acoustic signal is determined.

* * * * *